March 11, 1930. J. HOJNOWSKI 1,750,108

HELICOPTER AEROPLANE WITH A PLURALITY OF PROPELLERS

Filed May 6, 1929 2 Sheets-Sheet 1

Inventor
Jakob Hojnowski

Inventor
Jakob Hojnowski

Patented Mar. 11, 1930

1,750,108

UNITED STATES PATENT OFFICE

JAKOB HOJNOWSKI, OF NEKOOSA, WISCONSIN

HELICOPTER AEROPLANE WITH A PLURALITY OF PROPELLERS

Application filed May 6, 1929. Serial No. 360,850.

This invention relates to improvements in aeroplanes, and it is the principal object of my invention to provide an aeroplane equipped with a plurality of propellers and two helicopter planes being of a peculiar shape and construction.

Another object of my invention is the provision of an aeroplane of simple and therefore inexpensive construction yet provided with powerful lifting and driving means.

A further object of my invention is the provision of an aeroplane equipped with wings resembling those of a windmill which contributes to the rising and stabilizing of the craft and facilitates landing.

These and other objects and advantages of my invention will become more fully known as the construction thereof proceeds and will then be specifically defined in the appended claims.

In the accompanying drawings forming a material part of this disclosure:

Figure 1:
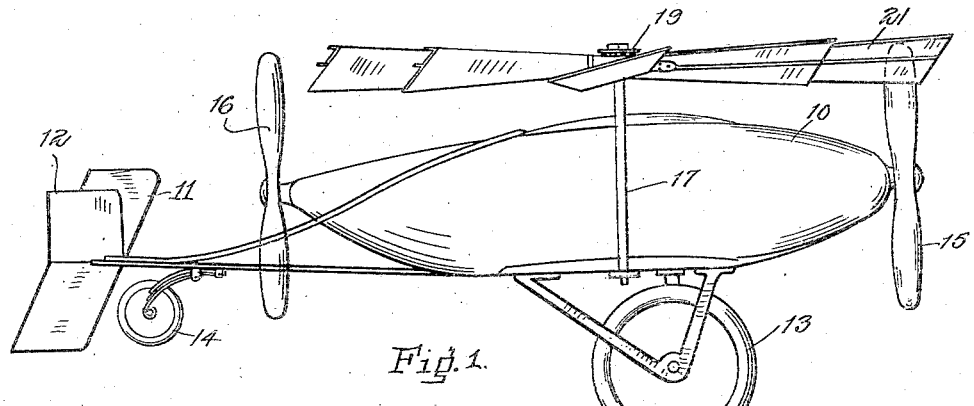
Fig. 1 is a side elevation of an aeroplane constructed according to my invention.
Figure 2:
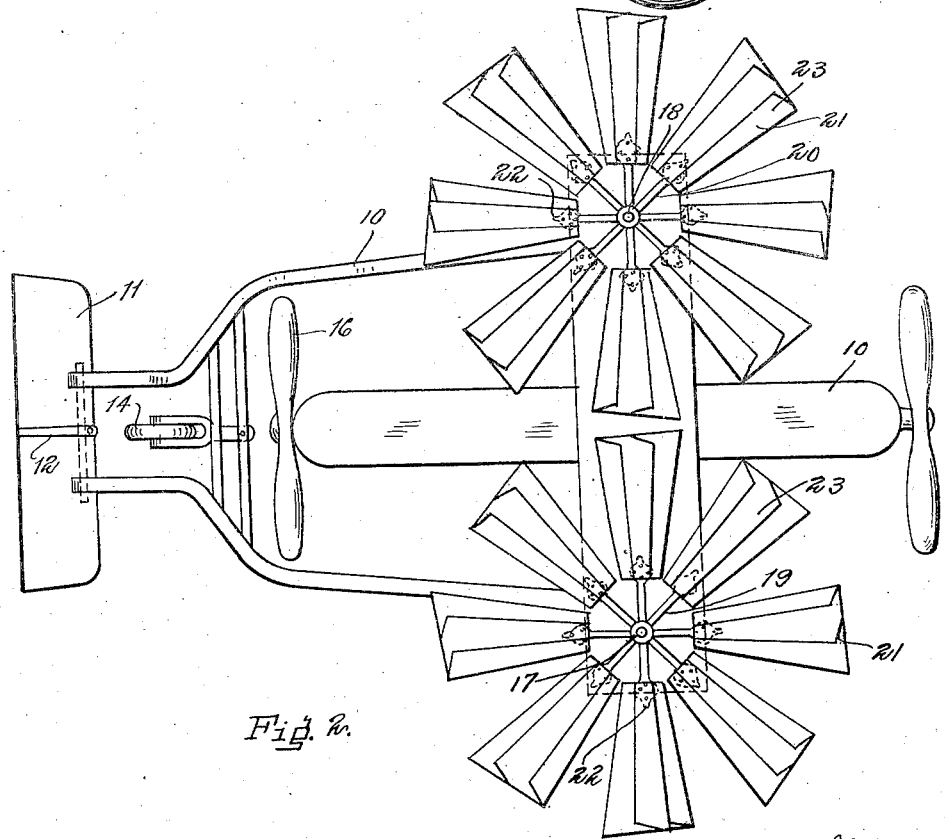
Fig. 2 is a top plan view of the same.
Figure 3:
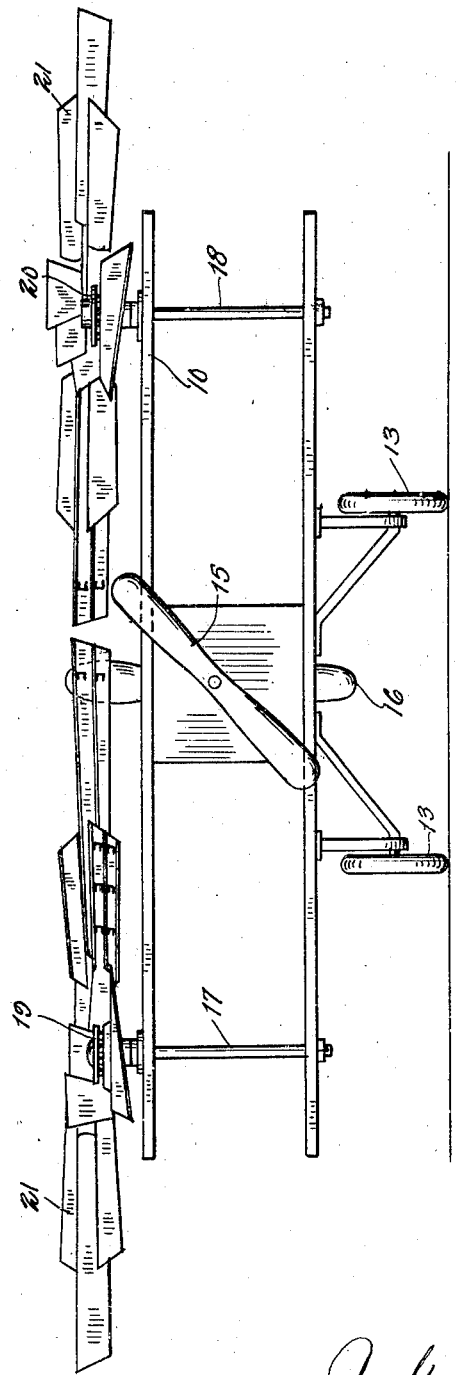
Fig 3 is a front elevation of my novel and improved aeroplane.

As illustrated, an aeroplane's fuselage 10 equipped with a horizontal rudder 11, vertical rudder 12, and front and rear landing gears 13 and 14 respectively is equipped with motor driven propellers 15 at the front and 16 at the rear.

Two laterally disposed vertical motor driven shafts 17 and 18 carry at their upper ends spiders 19 and 20 respectively having at the outer ends of each of their branches a wing 21 of peculiar construction.

Each of the wings 21 comprises a base having its inner end screwed to the respective branches of the spider by clamps 22 and at its upper outer face preferably two parallel planes 23 angularly disposed to the wing 21 so as to form a body resembling substantially the wing of a wind-mill or the like.

The operation of my device will be entirely clear from the above description and simultaneous inspection of the drawings, and it will be evident that the wind-mill wing-shaped propellers will act as helicopter wings and raise the plane vertically as well as contribute to its propulsion while the propellers will drive the aeroplane with an increased speed through the air. The wings will also greatly facilitate landing and contribute to the stabilization of the aeroplane.

It will be understood that I have shown and described the preferred form of my aeroplane only, and that I may make many changes therein such as come within the scope of the appended claims without departure from the spirit of my invention.

Having thus described my invention, what I claim as new and desire to secure by Letters Patent is:

1. In an aeroplane of the helicopter type including a fuselage, a pair of motor driven vertical shafts laterally disposed to the fuselage, a pair of wind-mill wings on two of said shafts, each of said wings composed of a spider secured to its shaft, and wing-body secured to the ends of the spider branches, clamps for securing said wing body to said branches, and a plurality of planes angularly disposed to said wing body.

2. In an aeroplane of the helicopter type including its fuselage, comprising motor driven shafts, spiders carried at the upper ends of said shafts, wings at the outer ends of the spider branches, each of said wings comprising a base plate and vanes angularly disposed to said plate, and means for securing the inner ends of said base plates to said spider branches.

Signed at Nekoosa, in the county of Wood and State of Wisconsin, this 17th day of January, A. D. 1929.

JAKOB HOJNOWSKI.